Oct. 12, 1965  C. L. SEEFLUTH  3,210,910
HEAT SEALING THERMOPLASTIC PACKAGES

Filed Aug. 7, 1961  3 Sheets-Sheet 1

INVENTOR
C.L. SEEFLUTH
BY Hudson and Young
ATTORNEYS

INVENTOR
C.L. SEEFLUTH

BY Hudson and Young

ATTORNEYS

Oct. 12, 1965   C. L. SEEFLUTH   3,210,910
HEAT SEALING THERMOPLASTIC PACKAGES

Filed Aug. 7, 1961

INVENTOR.
C. L. SEEFLUTH
BY
ATTORNEYS

United States Patent Office 3,210,910
Patented Oct. 12, 1965

3,210,910
HEAT SEALING THERMOPLASTIC PACKAGES
Charles L. Seefluth, Bartlesville, Okla., assignor to Phillips Petroleum Company, a corporation of Delaware
Filed Aug. 7, 1961, Ser. No. 129,788
3 Claims. (Cl. 53—373)

This invention relates to heat sealing of thermoplastic units. In one aspect the invention relates to a method for sealing thermoplastic units which includes interposing a thin metal flexible member between a heat source and unit to be sealed, the member being spaced from the source and the unit prior to and following the sealing step. In another aspect the invention relates to a heat sealing machine comprising a heated sealing element and a flexible member interposed and spaced between the element and the unit to be sealed. In another aspect this invention relates to a heat sealing element comprising a heated sealing element and a thin metal flexible member attached to the element and spaced from the face thereof. In another aspect this invention relates to a heat sealing element comprising a heated sealing element and a thin metal flexible member attached to the element by one edge and spaced from the face thereof.

Thermoplastic film and sheet materials are very useful for packaging many types of commodities, one well-known example being food products, and for the fabrication of other useful structures. One of the advantages of the use of thermoplastic materials is that heat sealing can be used to fabricate and seal packages such as bags, boxes, wrapped coatings, etc. and to complete the construction of other items. One method for heat sealing thermoplastic structures comprises contacting the material to be sealed with a heated sealing element. This method sometimes occasions difficulties due to adherence of the thermoplastic material to the heated sealing element. Where non-sticking materials have been interposed between the heated element and the unit to be sealed, these materials have had low thermal conductivity thus reducing the speed and efficiency of sealing operation.

An object of this invention is to prevent adherence of a heat sealing element and a thermoplastic unit being sealed.

Another object of this invention is to provide rapid heat sealing combined with elimination of adherence to the heat sealing element.

Another object of this invention is to provide improved method and apparatus for heat sealing thermoplastic packages.

Other aspects, objects and the several advantages of this invention are apparent in the written description, the drawing and the claims.

According to my invention a thin metal flexible member is interposed between a heated sealing element and a thermoplastic unit to be sealed, and is normally spaced apart from both the sealing element and the thermoplastic unit, contact of the thermoplastic unit and the sealing element being made through the flexible member, accompanied by some bending of this member. The thin metal flexible member can be attached to the sealing element by means which poistion it across the face thereof and spaced a short distance away from the face or it can be in the form of a continuous belt which travels at substantially the same linear speed as the unit to be sealed and the sealing elements, the belt being spaced between the two and apart from both. Where the thin metal flexible member is attached to the sealing element it can be done either by attaching at two edges whereby there is some flexing of the attaching means wherein the member is bent into contact with the sealing face or it can be attached at one edge thereof in which case the natural flexibility of the member itself is sufficient to permit it to contact the sealing face. In one preferred embodiment the flexible member is bent in the form of a coil spring at the attaching edge, thereby supplying additional flexibility of movement since this member can then be moved into contact with the sealing face through a combination of flexing and pivoting.

In the drawing—

Figure 1:
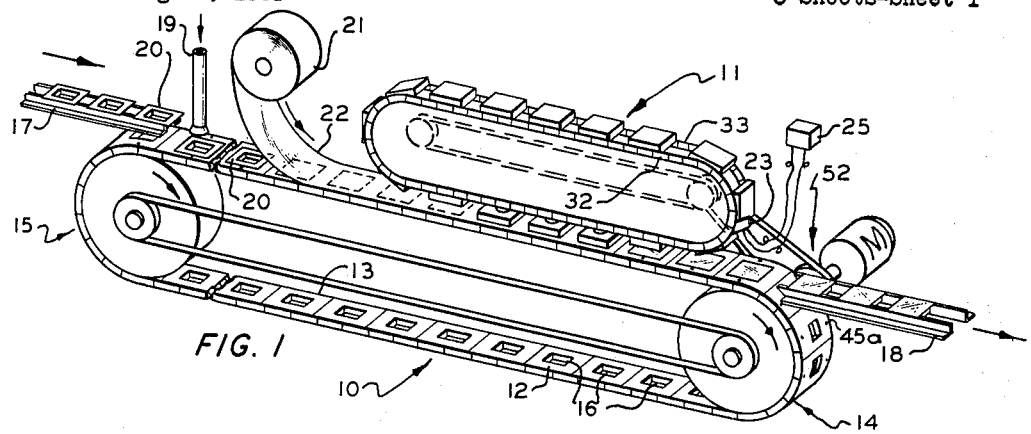
FIGURE 1 is a schematic diametric view of a package sealing machine according to my invention.

As illustrated in FIGURE 1, a complete package sealing machine comprises a package conveying section 10 and a sealing element conveying section 11. Section 10 comprises chains 12 and 13, a pair of driving sprockets 14 and a second pair of sprockets 15. Supported between chains 12 and 13 are a plurality of package receptacles 16. A package delivery conveyor 17 and a package removal conveyor 18 are provided as shown, conveyor 17 delivering empty packages to the machine and conveyor 18 removing filled and sealed packages from the machine for further processing. A package filling conduit 19 feeds the desired commodity into the empty packages 20 and a film feeding roll 21 feeds a thermoplastic cover film 22. A suitable cutter is provided to separate the film into individual covers for the packages but is not shown to simplify the illustration.

Figure 2:
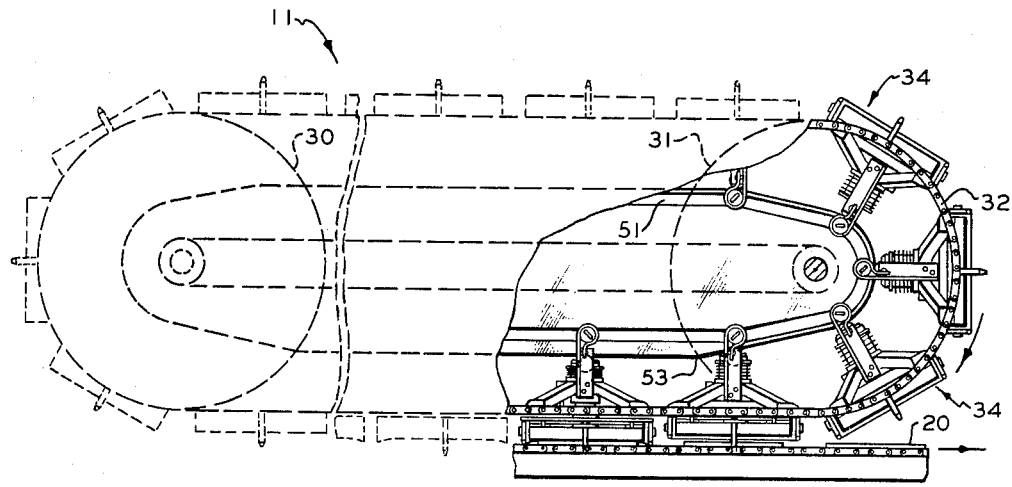
FIGURE 2 is an elevation, partly in cross section, of that portion of the apparatus which comprises the heat sealing units and the conveying mechanism therefore.

Section 11 is illustrated in more detail in FIGURE 2 and comprises pairs of sprockets 30 and 31 and driving chains 32 and 33 (see FIG. 1). A plurality of sealing units 34 (see FIG. 3) are attached between chains 32 and 33 with pivotal connections 35 and sliding connections 36. Pins 37 and 38 engage pivotal connection 35 and sliding connections 36, respectively.

Sealing units 34 further comprise a movable sealing element 39 which is provided with electrical heating elements 40 and 40a, brush assemblies 41 held in place by clamps 41a, a cam follower roller 43, a shoulder 44 and guide pins 45. Suitable electrical connections, not shown, are made between brush assemblies 41 and heating elements 40 and 40a. Shoulder 44 is formed on shaft 48, and a pair of leaf springs 49 are attached to shaft 48 at the lower end thereof and to element 39 by screws 49a. Frame 42 encircles shaft 48 but is not attached thereto. A guide pin 49b is attached to one of the leaf springs 49 and cooperates with guide bracket 42a attached to frame 42. Springs 49 provide a resilient connection between element 39 and shaft 48 and thus permit some variation in the thickness of the packages being sealed or minor misalignment of the carrying or sealing elements. A spring 46 is compressed between shoulder 44 and shoulder 47 to urge movable sealing element 39 to its retracted position. A thin metal flexible member 50 is attached to sealing unit 34 and extends over the sealing face of movable sealing unit 39 spaced from the sealing face as shown. As illustrated in FIGURE 2, sealing element conveyor section 11 also comprises bus bars 51, and elongated cam 53. A driving means 52 (see FIG. 1) drives both package conveying section 10 and sealing conveying section 11 through suitable chain drive assemblies to maintain the sections synchronized. Holes 45a are provided in package receptacle 16 to engage pins 45 to counteract any slight amount of lost motion in the mechanism and perfectly align sealing unit 34 with package receptacle 16.

In operation thermoplastic packages 20 are transported by conveyor 17 and fed into package receptacles 16 of package conveying section 10. As packages 20 pass by package filling conduit 19 they receive a predetermined amount of the commodity to be packaged. The filled packages then proceed along conveying section 10 and film 22 is fed over the top of these packages. As each package, conveyed in package receptacles 16, travels under section 11 a corresponding sealing unit 34 is positioned directly over the moving package. As the units proceed further, the roller 43 of movable sealing element 39 engages elongated cam 53 to move element 39 downward into engagement with the cover of the corresponding package. Guide pins 45 engage holes 45a for perfect alignment and the face of element 39 presses, through flexible member 50, against the package cover thus providing the necessary heat and pressure for effecting the desired seal. Cam 53 maintains element 39 in contact with the package assembly for a period of time sufficient to obtain a satisfactory seal with the film thickness, sealing temperature and speed of travel of the machine.

It will be seen that brush assemblies 41, through contact with bus bar 51 provide electrical power from a suitable source of electrical energy, not shown, to heating elements 40 and 40a. After the desired contact time, determined by the length of cam 53, sealing element 39 is retracted by spring 46, acting against shoulders 44 and 47. The sealing unit 34 proceeds on around the conveying section 11 while the now sealed package travels on toward the end of conveying section 10. Film 22 may be cut into individual cover pieces prior to, coincident with, or following the sealing operation. The sealed packages then proceed from section 10 on to package removal conveyor 18 for further handling which may include, for example, trimming, labeling, freezing, retorting, storage, transportation, etc.

Proper seal conditions are provided by controlling the length of contact path, the travel and temperature of the sealing element 39. The temperature of the sealing elements can be controlled through manipulation of temperature control means 23 and more specifically by adjusting the set point of controller 25. The length of time of the contact of sealing element 39 with the package to be sealed can be adjusted both by the speed of the conveying sections and the length of elongated cam 53. The contact pressure also can be modified by adjusting cam 53 by changing the height thereof. Where desirable, suitable heating means can be provided for the packages and/or the cover film.

Figure 4:
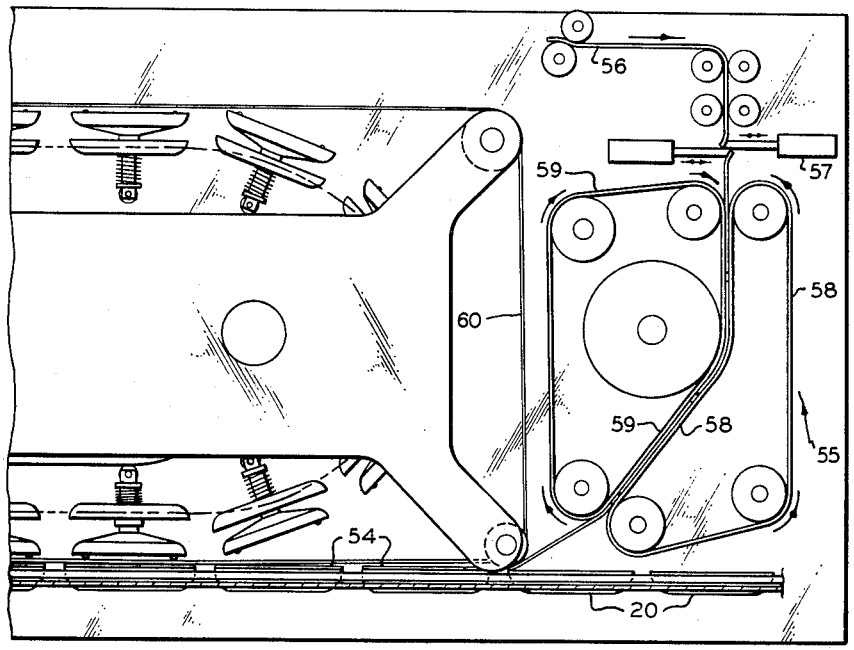
FIGURE 4 is a schematic elevation of another embodiment of the heat sealing and conveying apparatus.

In another embodiment of my invention, for use especially in those instances in which separate pre-cut lids are fed to the package, the flexible elements 50 can be eliminated and an edless thin metal belt arranged to run between the sealing elements and the units being sealed. This is illustrated schematically in FIGURE 4 in which belt 60 is spaced both from the sealing elements 39 and from the packages to be sealed, thus incurring some flexing and bending each time it is contacted by one of the descending sealing elements 39. Lids are fed from lid cutting and feeding unit 55, the lids being cut from a continuous film 56 by a cutter 57. The operation of this cutter is coordinated with the speed of travel of the film to cut the desired lengths and is positioned so that one end of each cut length is held at all times. From cutter 57 the cut film is fed to belts 58 and 59 and proceeds from the outlet of unit 55 between packages 20.

Although the apparatus as illustrated comprises a conveyor moving in a vertical plane for transporting sealing units 34 a conveyor moving in a horizontal plane also can be used in which case the sealing face is oriented parallel to the plane of the conveyor. In this apparatus shown in the drawing and described above, a preferred embodiment of the invention, the path of the sealing element is deviated to cause sealing engagement. However, it is also possible to deviate the path of the package being sealed to cause sealing engagement with the sealing element and control the deviation and pressure of the sealing period.

Figure 5:
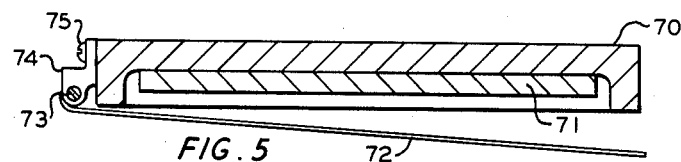
FIGURE 5 is a schematic cross section of a single heat sealing unit comprising a thin metal flexible member attached at one edge thereof.
Figure 6:
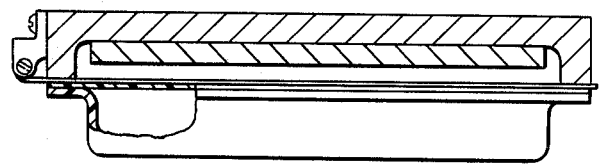
FIGURES 6 and 7 illustrate the unit of FIGURE 5 in operation in sealing and in being released from a thermoplastic package.
Figure 7:
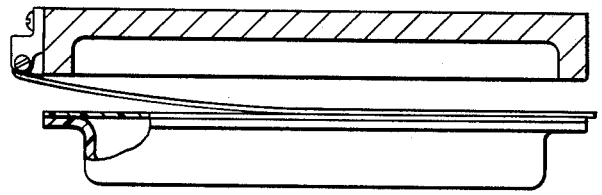

In the embodiment illustrated in FIGURE 5 a heated sealing element 70 is provided with a layer of insulation 71 and with a thin metal flexible member 72 attached by means of slotted rod 73 and bracket 74 held in place by screws 75 to member 70. Preferably member 72 has a coil spring configuration in cross section as illustrated. When this embodiment of my invention is brought into contact with a package to be sealed, as illustrated in FIGURE 6, member 72 is flexed and pivoted to contact the face of member 70 and thus conducts heat from the member to the package to be sealed. After the seal has been made and the sealing element and package begin to move apart, as shown in FIGURE 7, flexible member 72 pivots and flexes so that it leaves the sealed surface of the package with a peeling action, the point of release moving from left to right as illustrated in this figure.

In each of the embodiments illustrated a suitable thin metal flexible member is interposed between the heated sealing face of a sealing member and the thermoplastic unit which is to be sealed, this metal flexible member being normally spaced apart from both the sealing member and the thermoplastic unit and incurring some deformation, flexing and bending, during the interval of obtaining sealing engagement and the interval of disengagement. Further, in the embodiment illustrated in FIGURES 5, 6 and 7, a definite peeling action is provided. These features I have found are very advantageous in preventing adherence of the sealing element and the unit to be sealed, being successful in preventing such adherence even though the separation occurs while the seal is still heated, no precooling being required either to remove the sealing element or the flexible member from engagement with the sealed unit when my invention is utilized. Further, through the use of metallic flexible members, members having a relatively high thermal conductivity are provided. By the use of a thin, metallic sheet having a thickness of .05 to 10 mil, preferably 1 to 3 mil, when supported at both ends and 3 to 5 mil when supported at one end, which is not in contact with the heating element except when pressed against plastic unit to be sealed, the fast sealing times of bare metal can be obtained on thin films without burning or sticking because of the flexible bending, flexing and cooling release which is provided. Suitable metals for the practice of my invention include aluminum and stainless steel but other metals can be used. In the embodiment illustrated in FIGURES 5, 6 and 7, it is preferred that the metal be capable of being fabricated in a form having considerable elasticity so that it will return to its original shape when released.

Very fine metal wire mesh, for example, wire screen having a sieve number between about 100 and 350, preferably 120 to 300, can also be used in the practice of my invention.

Figure 3:
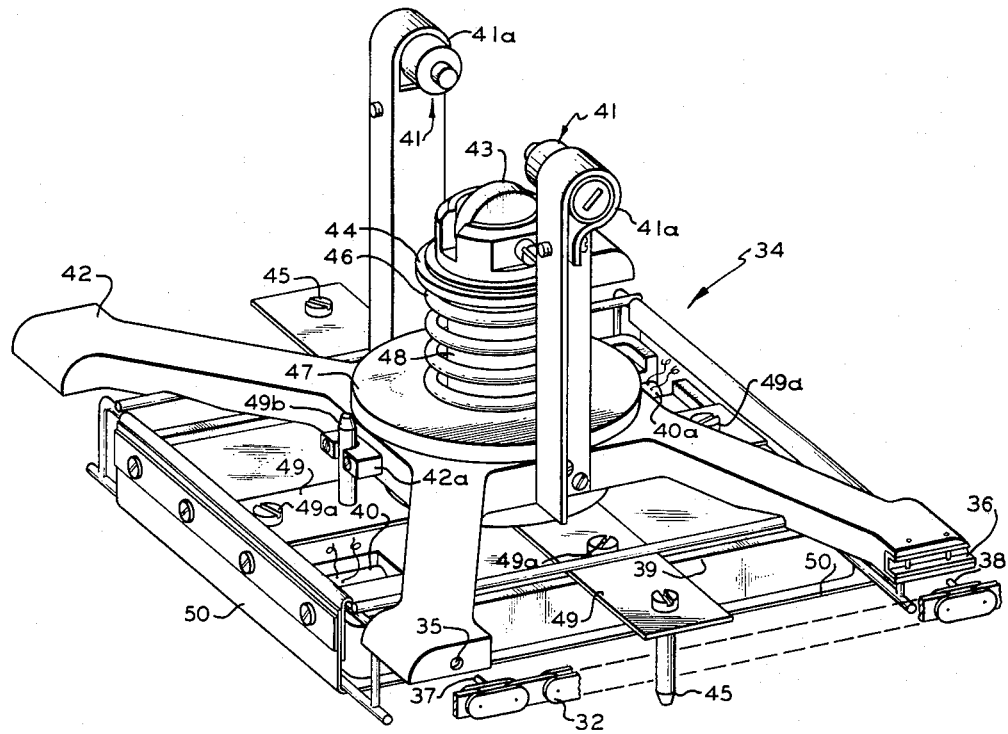
FIGURE 3 is an enlarged diametric view of a single heat sealing unit.

Using a sealing head of the type illustrated in FIGURE 3 utilizing a 3-mil polytetrafluoroethylene cloth cover over an aluminum heater at a temperature of 525 F. an 8-mil polyethylene cover is sealed on a 20-mil polyethylene package in 1.6 seconds. Using a 1-mil Hastelloy B the sealing time is 1.0 second and the same sealing time is accomplished with a stainless steel flexible member. Using a 1-mil aluminum member the sealing time is 0.8 second.

Using the same type of sealing head and with the aluminum heater at a temperature of 350° F., a 4-mil polyethylene cover is sealed to a 20-mil polyethylene tray in 1.8 seconds using a 3-mil polyetetrafluoroethylene cloth cover, 1.1 seconds using a 1-mil Hastelloy B or a stainless steel member and 0.9 second using a 1-mil aluminum member.

With the aluminum heater at a temperature of 400° F. a 1.2 mil cover is sealed to a 1.2 mil package in 0.35 second using the 3-mil polytetrafluoroethylene cloth cover, in 0.12 second using a 1-mil Hastelloy B or stainless steel member, in 0.10 second using a 1-mil aluminum member.

Reasonable variation and modification are possible within the scope of my invention in which are set forth method and apparatus for heat sealing thermoplastic packages utilizing a thin metal flexible member interposed between a heated sealing element and a thermoplastic unit, this member being spaced from both the sealing element and the thermoplastic unit and incurring some flexing and bending as the two are moved into and out of sealing engagement.

I claim:

1. Means for sealing a thermoplastic unit comprising means to locate said unit in sealing position, a heat sealing element, a substantially planar thin metal flexible member interposed between and spaced apart from said unit and said element, said member being supported by one edge thereof at an acute angle with said sealing element, means to move said element and said unit into sealing engagement whereby said element contacts said flexible member and supplies heat therethrough to seal said unit and means to move said element away from said unit and out of contact with said member, whereby said flexible member is removed from contact with said unit with a peeling action along a single line of contact.

2. Heat sealing apparatus comprising:
means to locate a thermoplastic unit in sealing position;
a heat sealing element having a sealing face;
a generally planar thin metal flexible member having an edge curved to form an arcuate cross section;
means to attach said one edge in fixed relationship with said sealing element to position said flexible member across said face, normally spaced therefrom at an acute angle with said face;
means to move said sealing element into sealing engagement with said thermoplastic unit whereby said flexible member contacts said thermoplastic unit and is pressed against said face, said sealing element supplying heat through said flexible member to seal said unit; and
means to move said sealing element away from said thermoplastic unit whereby said flexible member is removed from said thermoplastic unit with a peeling action along a single line of contact.

3. The apparatus of claim 2 wherein said thin metal flexible member has a thickness in the range of 3–5 mils.

References Cited by the Examiner
UNITED STATES PATENTS

| | | |
|---|---|---|
| 2,624,992 | 1/53 | Salfisberg. |
| 2,638,964 | 5/53 | Andina _____ 156—580 |
| 3,070,004 | 12/62 | Dodsworth _____ 156—583 X |

FRANK E. BAILEY, *Primary Examiner.*

CARL F. KRAFFT, TRAVIS S. McGEHEE, *Examiners.*